คำ

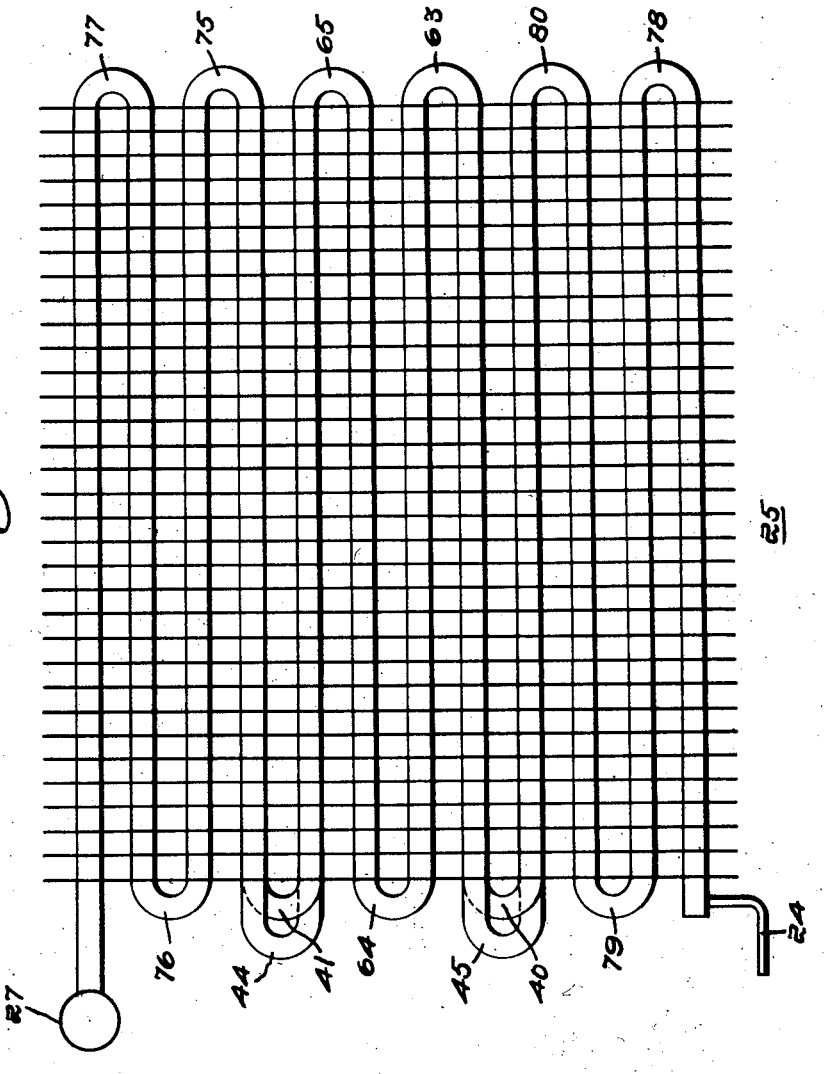

United States Patent Office 2,806,674
Patented Sept. 17, 1957

2,806,674

HEAT PUMPS

Gerald L. Biehn, Needham, Mass., assignor to Westinghouse Electric Corporation, East Pittsburgh, Pa., a corporation of Pennsylvania Application September 2, 1954, Serial No. 453,719

6 Claims. (Cl. 257—3)

This invention relates to air conditioning units, and relates more particularly to reverse cycle refrigerant units used for cooling air in summer and for heating air in winter, and generally known as "heat pumps."

As disclosed in the Ditzler-Bien Patent No. 2,672,734, a heat pump may have an indoor air coil used as a refrigerant condenser for heating indoor air, and may have booster heaters of the electrical resistance type which are used when such low outdoor air temperatures occur that the heat pump is unable to raise the indoor air to the desired temperature.

It has been the practice to control such booster heaters by two methods. One method has been to turn the booster heaters on and off by the same indoor thermostat that controls the heat pump. This method has the disadvantage that if the thermostat setting is raised by a room occupant, booster heat is brought on even though the heat pump is capable of raising the indoor temperature to the new setting after only limited operation. Another disadvantage of this method is that when the outdoor temperature rises following a cold spell, the booster heat will be kept on longer than is necessary because of the house lag and the inability of the indoor thermostat to sense the outdoor temperature rise. Still another disadvantage of this method is that all of the booster heaters have been turned on simultaneously and have increased the power demand unnecessarily.

The other method has been to control the several booster heaters by individual outdoor thermostats, additional booster heaters being turned on as the outdoor temperature drops. This method has the disadvantage that booster heaters are often turned on during periods when the fly wheel effect of the house would enable the heat pump to carry the heating load, thus supplying booster heat when it is not needed.

A feature of this invention is that the booster heaters used with a heat pump are controlled by a combination of indoor and outdoor thermostats. Individual outdoor thermostats partially close the energizing circuits of their associated booster heaters, and an indoor thermostat completes the closing of such circuits for aiding the heat pump to heat the house only when the heat pump acting alone cannot maintain the desired indoor temperature.

Another feature of this invention is that the main indoor air coil and the outdoor air coil of a heat pump each have the same plurality of refrigerant circuits with such circuits so interlaced through the rows of tubes of their respective coils that each circuit has the same exposure to entering and leaving air, thus loading all circuits of the coils equally.

An object of this invention is to increase the efficiency of a heat pump.

Another object of this invention is to reduce the operating cost of a heat pump.

Another object of this invention is to provide an improved temperature control system for a heat pump having booster heaters.

Another object of this invention is to provide a coil having a plurality of circuits for the passage of refrigerant, each circuit having the same exposure to air entering and leaving the coil.

This invention will now be described with reference to the annexed drawings, of which:

Fig. 2 is a side elevation of one of the coils of the heat pump.

Figure 1:
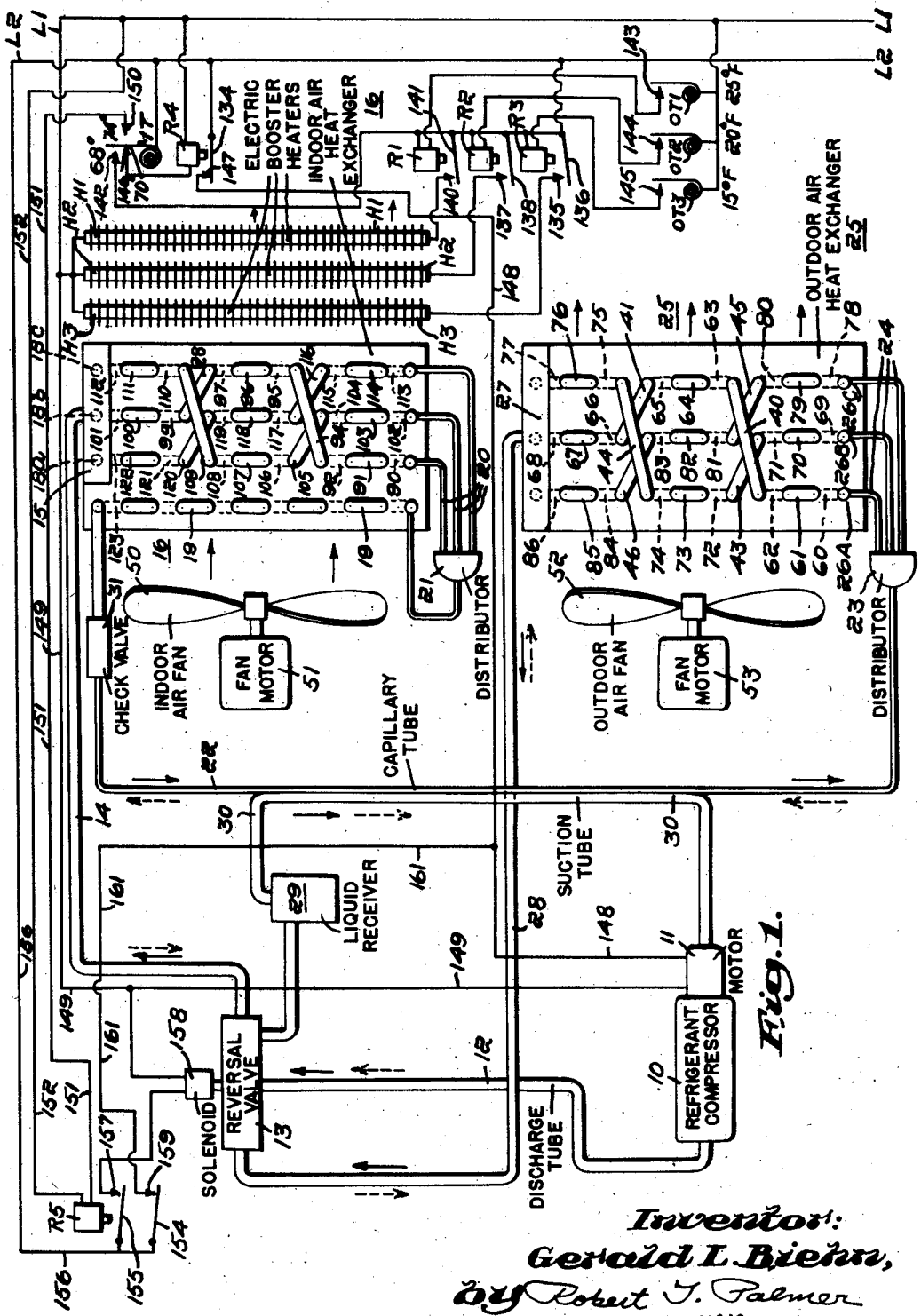
Fig. 1 is a diagrammatic view of a heat pump embodying this invention.

The hermetically sealed refrigerant compressor 10 driven by the built-in electric motor 11, has its discharge side connected through the tube 12 to a conventional reversal valve 13 such as is disclosed in said patent. During air heating operation, the valve is adjusted to route refrigerant through the tube 14 to the header 15 of the indoor air coil 16. The full line arrows alongside the tubing indicate the direction of refrigerant flow at this time. During air cooling operation, the valve is adjusted to route the refrigerant through the tube 28 to the header 27 of the outdoor air coil 25. The dashed line arrows alongside the tubing indicate the direction of refrigerant flow during air cooling operation.

The indoor air coil 16 has the three vertical rows, 18A, 18B and 18C of finned tubes forming the main indoor air coil, and has the additional vertical row 19 of finned tubes located upstream with respect to the flow of indoor air, of the other rows. The tubes of the row 19 are exposed to cooler air and act as a sub-cooler during air heating operation, and act as a pre-evaporator during air cooling operation, as disclosed in my co-pending application Serial No. 383,251 which was filed September 30, 1953. The fan 50 driven by the electric motor 51 recirculates room air through the coil 16.

The bottom tubes of the rows 18A, 18B and 18C are connected through the distributor tubes 20 to the distributor 21 which is connected to the bottom tube of the row 19. The top tube of the row 19 is connected through the check valve 31 to one of the capillary tubes 22, the other end of which is connected to the distributor 23. The valve 31 is of the type disclosed in said application, and which is operated by the direction of flow of refrigerant to permit free flow of refrigerant during air cooling operation, and to offer resistance to the flow of refrigerant during air heating operation.

The outdoor air coil 25 has the three vertical rows 26A, 26B and 26C of finned tubes. The bottom tubes of these rows are connected to the distributor 23 through the distributor tubes 24. The top tubes of these rows are connected through the header 27 and tube 28 to the reversal valve 13 which is connected through the discharge tube 12 to the discharge side of the compressor 10, and through the liquid receiver 29 and the suction tube 30 to the suction side of the compressor. The fan 52 driven by the electric motor 53 moves outdoor air through the coil 25.

The outdoor air coil 25 has three refrigerant circuits in parallel, and for providing that each such circuit shall have the same air load, the circuits are interlaced through the rows of tubes of the coil 25. One refrigerant circuit starting at the bottom tube of row 26A continues through three succeeding tubes of the same row and their return bends 60, 61 and 62, then goes through return bend 40 into the fifth tube from the bottom of the row 26C, then through three succeeding tubes of row 26C and their return bends 63, 64 and 65, then goes through return bend 41 into the fourth tube from the top of row 26B. It then continues through the remaining upper tubes of row 26B and their return bends 66, 67 and 68 into the outlet header 27. The second refrigerant circuit starts at the bottom tube of row 26B and continues through three succeeding tubes of the same row and their return bends 69, 70 and 71, then through return bend 43 into the fifth tube from the bottom of row 26A, then through three succeeding tubes of row 26A and their return bends 72, 73 and 74, then through return bend 44 into the fourth tube from the top of row 26C, and then through three upper tubes of row 26C and their return bends 75, 76 and 77 into the outlet header 27. The third refrigerant circuit starting at the bottom tube of row 26C goes through three succeeding tubes of the same row and their return bends 78, 79 and 80, then through return bend 45 into the fifth tube from the bottom of row 26B, then through three succeeding tubes of row 26B and their return bends 81, 82 and 83, then through the return bend 46 into the fourth tube from the top of row 26A, and then through the remaining tubes of row 26A and their return bends 84, 85 and 86 into the outlet header 27. Thus, each of the circuits flows through the same number of tubes in the inner, middle and outer vertical rows of tubes of the coil so that each circuit is equally loaded.

The main portion of the indoor air coil 16 has three vertical rows 18A, 18B and 18C of finned tubes and also has three refrigerant circuits flowing in parallel through these tubes, the circuits being interlaced as in the case of the outdoor coil 25. One refrigerant circuit starting at the bottom tube of row 18A continues through three upper tubes of the same row and their return bends 90, 91 and 92, then goes through return bend 94 into the fifth tube from the bottom of row 18C, then through three succeeding tubes of row 18C and their return bends 95, 96 and 97, then goes through return bend 98 into the fourth tube from the top of row 18B. It then continues through the remaining upper tubes of row 18B and their return bends 99, 100 and 101 into the outlet header 15. The second refrigerant circuit starts at the bottom tube of row 18B and continues through three succeeding tubes of the same row and their return bends 102, 103 and 104, then through return bend 105 into the fifth tube from the bottom of row 18A, then through three succeeding tubes of row 18A and their return bends 106, 107 and 108, then through return bend 109 into the fourth tube from the top of row 18C, and then through the remaining tubes of row 18C and their return bends 110, 111 and 112 into the outlet header 15. The third refrigerant circuit starting at the bottom tube of row 18C, goes through three succeeding tubes of the same row and their return bends 113, 114 and 115, then through return bend 116 into the fifth tube from the bottom of row 18B, then through three succeeding tubes of row 18B and their return bends 117, 118 and 119, then through the return bend 120 into the fourth tube from the top of row 18A, and then through the remaining tubes of row 18A and their return bends 121, 122 and 123 into the outlet header 15. Thus, each of the three circuits extends through the same number of tubes in the inner, middle and outer vertical rows of tubes of the main portion of the coil 16 so that each circuit is equally loaded.

The electric resistor, booster heaters H1, H2 and H3 are arranged in vertical rows at the downstream side of the coil 16, and are connected together at corresponding ends to the electric line L1. The other end of the heater H3 is connected to the contact 135 of the relay R3 which has an armature 136 connected to the other electric line L2. The other end of heater H2 is connected to the contact 137 of the relay R2 which has an armature 138 connected to L2. The other end of the heater H1 is connected to the contact 140 of the relay R1 which has an armature 141 connected to L2.

The energizing windings of the relays R1, R2 and R3 are connected at corresponding ends to the contact 142 of the indoor thermostat IT which is connected to L2. The other end of the energizing winding of the relay R1 is connected to the contact 143 of the outdoor thermostat OT1 which is connected to L1. The other end of the energizing winding of the relay R2 is connected to the contact 144 of the outdoor thermostat OT2 which is connected to L1. The other end of the energizing winding of the relay R3 is connected to the contact 145 of the outdoor thermostat OT3 which is connected to L1.

The indoor thermostat IT has the contact 146 which is connected in series with the energizing winding of the relay R4 to L1. The armature 134 of the relay R4 is connected to L2, and its contact 147 is connected by the wiring 148 to one side of the compressor motor 11, the other side of which is connected through the wiring 149 to L1. The contact 146 is closed by contact with the indoor thermostat IT when it calls for heat, and energizes the relay R4 which connects the compressor motor 11 across L1 and L2 for starting the compressor. At this time, the reversal valve 13 will be in the heating position as a result of the deenergization of its actuating solenoid 158 so that the indoor coil 16 will be the condenser and will heat the indoor air.

The indoor thermostat IT has the contact 150 which is connected through the wiring 151 to one side of the energizing winding of the relay R5, the other side of which is connected through the wiring 152 to L1. The armatures 154 and 155 of the relay R5 are connected together and through the wiring 156 to L2. The contact 157 of the armature 155 is connected to one side of the energizing winding of the solenoid 158, the other side of which is connected through the wiring 149 to L1.

The contact 159 of the relay armature 154 is connected through the wiring 161 to one side of the compressor motor 11, the other side of which is connected through the wiring 149 to L1.

The contact 150 of the indoor thermostat is closed by contact with the indoor thermostat when indoor air cooling is required, and energizes the relay R5 which pulls up its armatures 154 and 155 against the contacts 159 and 157 respectively, and connecting the solenoid 158 and the compressor motor 11 across L1 and L2. The reversal valve 13 is then adjusted by the solenoid 158 to cooling position, and the compressor motor 11 is started to operate the compressor 10. When the solenoid 158 is de-energized, the reversal valve is automatically restored to heating position as described in said patent.

When the indoor thermostat IT calls for heat at say 70° F., the energizing winding of the relay R4 will be connected by the thermostat IT across L1 and L2, energizing the relay R4 which will pull up its armature 134 against its contact 147 connecting the compressor motor across L1 and L2. The solenoid 158 is de-energized at this time so that the reversal valve 13 is in heating position. The compressor motor will start the compressor 10 which will supply refrigerant into the indoor air coil 16 acting as condenser so that it will heat the indoor air passed through it by the fan 50. The outdoor coil acts as evaporator at this time, absorbing heat from the outdoor air passed through it by the fan 52. The refrigerant is compressed in the compressor, condensed in the indoor air coil 16, and expanded through the valve 31, the capillary tube 22, the distributor 23 and the tubes 24 into the outdoor coil 25. The row 19 of tubes of the coil 16 acts at this time as a sub-cooler as described in said application.

If the indoor temperature is below, say 68° F., a circuit connecting the energizing windings of the relays R1, R2 and R3 through the indoor thermostat IT to L2 will be completed. If the outdoor temperature is not as low as say 25° F., nothing else will happen since after a short period of time the heat pump should be able to raise the indoor temperature to the desired point.

If, however, the outdoor temperature has fallen to say 25° F., the outdoor thermostat OT1 will close its contact 143 connecting relay R1 to L1. Relay R1 is now connected across L1 and L2 and pulls up its armature 141 against its contact 140 connecting the booster heater H1 across L1 and L2. The booster heater H1 will then aid the indoor coil 16 to heat the indoor air.

If the outdoor air temperature decreases to say 20° F., the outdoor thermostat OT2 will close its contact 144 connecting relay R2 to L1. Relay R2 will be energized and will pull up its armature 138 against its contact 137 connecting the booster heater H2 across L1 and L2.

If the outdoor temperature drops to say 15° F., the outdoor thermostat OT3 will close its contact 145 connecting relay R3 across L1 and L2. The relay R3 will then become energized and will pull up its armature 136 against its contact 135 connecting the booster heater H3 across L1 and L2.

The booster heaters operate only if and when the outdoor temperature falls below the balance point of the heat pump and remains below the balance point for an appreciable time. For any design condition there is a temperature-capacity point on the heat pump capacity curve where the heat pump capacity exactly equals the heat loss of the house at a particular outdoor temperature. This may be easier to understand if it is said that the heat loss of the house varies directly with the difference between outdoor and indoor design temperatures. If the outdoor temperature continues to drop after reaching the balance point temperature, it will be necessary to supply booster heat. Detail instructions for finding such a balance point temperature are found in the Bulletin 2330 published by Westinghouse Electric Corporation and entitled "Westinghouse Heat Pump."

There may be times at which the outdoor temperature is low enough that one or more of the outdoor thermostats partially close the energizing circuits of their booster heaters, but if the heat pump alone can carry the heating load, the indoor thermostat will not complete the energizing circuits of the booster heaters.

The heat pump is completely automatic, and when there is no longer any need for heating, and instead, cooling is required, the indoor thermostat IT will open its contacts 146 and 142, and will close its contact 150. This will connect relay R5 across L1 and L2, which relay will pull up its armatures 154 and 155 against the contacts 159 and 157 respectively, closing circuits connecting the solenoid 158 and the compressor motor 11 across L1 and L2. The solenoid will then adjust the reversal valve 13 to cooling position, and the compressor 10 will be started. The refrigerant compressed in the compressor is then condensed in the outdoor air coil 25 and expanded through the capillary tube 22 into the indoor air coil 16. At this time, the row 19 of tubes of the indoor air coil acts as a pre-evaporator as described in said application.

While one embodiment of the present invention has been described for the purpose of illustration, it should be understood that the invention is not limited to the exact apparatus and arrangement of apparatus illustrated and described, since modifications thereof may be suggested by those skilled in the art without departure from the essence of the invention.

I claim:

1. A heat pump comprising a compressor, an indoor air coil and an outdoor air coil in a refrigerant circuit with the indoor coil acting as a condenser for heating the indoor air, and the outdoor air coil acting as an evaporator for absorbing heat from the outdoor air, and electric booster heater for aiding said indoor coil in heating the indoor air, indoor thermostatic means for starting said compressor at a predetermined indoor temperature and for maintaining said compressor in operation while the indoor temperature remains below said predetermined temperature, an outdoor thermostat, and means including said indoor thermostatic means and said outdoor thermostat for energizing said heater when the indoor temperature decreases to a predetermined temperature lower than said first mentioned temperature and when the outdoor temperature is at a predetermined level lower than said first and second mentioned temperatures.

2. A heat pump comprising a compressor, an indoor air coil and an outdoor air coil in a refrigerant circuit with the indoor coil acting as a condenser for heating the indoor air, and the outdoor air coil acting as evaporator for absorbing heat from the outdoor air, an electric booster heater for aiding said indoor coil in heating the indoor air, indoor thermostatic means for starting said compressor at a predetermined indoor temperature and for maintaining said compressor in operation while the indoor temperature remains below said predetermined temperature, means including a relay for energizing said heater, an outdoor thermostat, and means including said indoor thermostatic means and said outdoor thermostat for actuating said relay to energize said heater when the indoor temperature decreases to a predetermined temperature lower than said first mentioned temperature and when the outdoor temperature is at a predetermined level lower than said first and second mentioned temperatures.

3. A heat pump comprising a compressor, an indoor air coil and an outdoor air coil in a refrigerant circuit with the indoor air coil acting as a condenser for heating the indoor air and the outdoor air coil acting as an evaporator for absorbing heat from the outdoor air, indoor thermostatic means for starting said compressor at a predetermined indoor temperature and for maintaining said compressor in operation while the indoor temperature remains below said predetermined temperature, a first electric booster heater for aiding said indoor air coil in heating the indoor air, a first outdoor thermostat, means including said indoor thermostatic means and said outdoor thermostat for energizing said heater when the indoor temperature decreases to a predetermined temperature lower than said first mentioned temperature and when the outdoor temperature is at a predetermined level lower than said first and second mentioned temperatures, a second electric booster heater for aiding said indoor air coil in heating the indoor air, a second outdoor thermostat, and means including said indoor thermostatic means and said second outdoor thermostat for energizing said second booster heater when the indoor temperature has decreased to said predetermined temperature lower than said first mentioned temperature and the outdoor temperature is at a predetermined level below said first mentioned outdoor level.

4. A heat pump as claimed in claim 3 in which a third electric booster heater for aiding said indoor coil in heating the indoor air and a third outdoor thermostat are provided and in which means including said indoor thermostatic means and said third outdoor thermostat energizes said third booster heater when the indoor temperature has decreased to said predetermined temperature lower than said first mentioned temperature and the outdoor temperature has decreased to a predetermined level below the level at which said second booster heater was energized.

5. A heat pump comprising a compressor, an indoor air coil and an outdoor air coil in a refrigerant circuit with the indoor air coil acting as a condenser for heating the indoor air and with the outdoor air coil acting as an evaporator for absorbing heat from the outdoor air, indoor thermostatic means for starting said compressor at a first predetermined indoor temperature and for maintaining said compressor in operation while the indoor temperature remains below said predetermined temperature, a first electric booster heater for aiding said indoor coil in heating the indoor air, a first outdoor thermostat, a first relay, means including said relay for energizing said heater, means including said indoor thermostatic means and said outdoor thermostat for actuating said relay to energize said heater when the indoor temperature decreases to a predetermined temperature lower than said first temperature and the outdoor temperature is at a first predetermined level lower than said first temperature, a second booster heater for aiding said indoor coil in heating the indoor air, a second outdoor thermostat, a second relay, means including said second relay for energizing said second heater, and means including said indoor thermostatic means and said second outdoor thermostat for actuating said second relay for energizing said second heater when the indoor temperature has decreased to said predetermined temperature lower than said first temperature and the outdoor temperature is at a second level lower than said first level.

6. A heat pump as claimed in claim 5 in which a third electric booster heater for aiding said indoor coil in heating the indoor air, a third relay and a third outdoor thermostat are provided, and in which means including said indoor thermostatic means and said third thermostat actuates said third relay when the indoor temperature has decreased to said predetermined temperature lower than said first temperature and when the outdoor temperature is at a third level below said second level, and in which means including said third relay when actuated energizes said third heater.

References Cited in the file of this patent

UNITED STATES PATENTS

| | | |
|---|---|---|
| 2,054,404 | Askin | Sept. 15, 1936 |
| 2,071,178 | Roessler | Feb. 16, 1937 |
| 2,110,168 | Parks et al. | Mar. 8, 1938 |
| 2,148,414 | Wolfert et al. | Feb. 21, 1939 |
| 2,241,060 | Gibson | May 6, 1941 |
| 2,320,501 | Taylor | June 1, 1943 |
| 2,342,566 | Wolfert | Feb. 22, 1944 |
| 2,431,501 | Burgess | Nov. 18, 1947 |
| 2,468,626 | Graham | Apr. 26, 1949 |
| 2,488,636 | Mendenhall et al. | Nov. 22, 1949 |
| 2,544,544 | Qualley et al. | Mar. 6, 1951 |
| 2,669,099 | Malkoff | Feb. 16, 1954 |
| 2,672,734 | Ditzler et al. | Mar. 23, 1954 |